US005866071A

United States Patent [19]

Leu

[11] Patent Number: 5,866,071

[45] Date of Patent: Feb. 2, 1999

[54] CENTRIFUGE TUBE WITH A BUILT-IN SMALL TUBING FOR SEPARATION FOLLOWING DENSITY GRADIENTS CENTRIFUGATION

[75] Inventor: Fur-Jiang Leu, Shin-Diann city, Taiwan

[73] Assignee: National Science Council, Taipei, Taiwan

[21] Appl. No.: 611,794

[22] Filed: Mar. 6, 1996

[51] Int. Cl.[6] .................................................. G01N 9/30

[52] U.S. Cl. .............................. 422/72; 422/81; 422/101; 422/102; 436/177; 436/45; 73/863.21; 73/864.34; 210/294; 210/512.1; 210/302

[58] Field of Search ................................ 422/72, 81, 101, 422/102; 436/177, 52, 45; 73/863.21, 864.34; 210/294, 302, 512.1

[56] References Cited

U.S. PATENT DOCUMENTS

| | | | |
|---|---|---|---|
| 4,003,834 | 1/1977 | Coombs | 422/72 X |
| 4,346,608 | 8/1982 | Olenick et al. | 73/863.21 |
| 5,284,773 | 2/1994 | Kilkarni et al. | 436/52 |
| 5,393,674 | 2/1995 | Levine et al. | 436/177 |
| 5,562,823 | 10/1996 | Reeves | 210/243 |
| 5,575,914 | 11/1996 | Jeyendran | 210/445 |

*Primary Examiner*—Harold Y. Pyon
*Attorney, Agent, or Firm*—Jeing & Chang

[57] ABSTRACT

A new type of centrifuge tube convenient for separation after density gradients centrifugation is invented. The inner bottom of the centrifuge tube is in a funnel shape, and an orifice is located at the narrowest place of the funnel neck. The orifice connects to a small tube, which is built inside the centrifuge tube wall and spanning the entire length of the centrifuge tube. The centrifuge tube can be used either as a centrifuge tube or a separation funnel. Such a tube not only saves time but also improves the efficiency of separation after density gradients centrifugation, because the built-in small tube is capable of performing separation by means of siphonic effect.

7 Claims, 9 Drawing Sheets

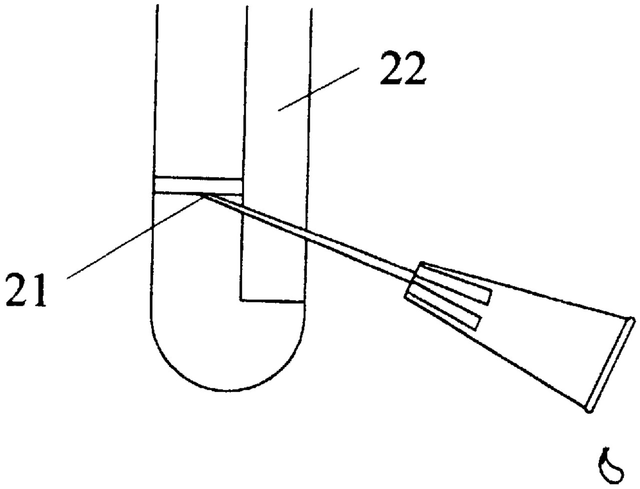
*FIG. 2* B
PRIOR ART

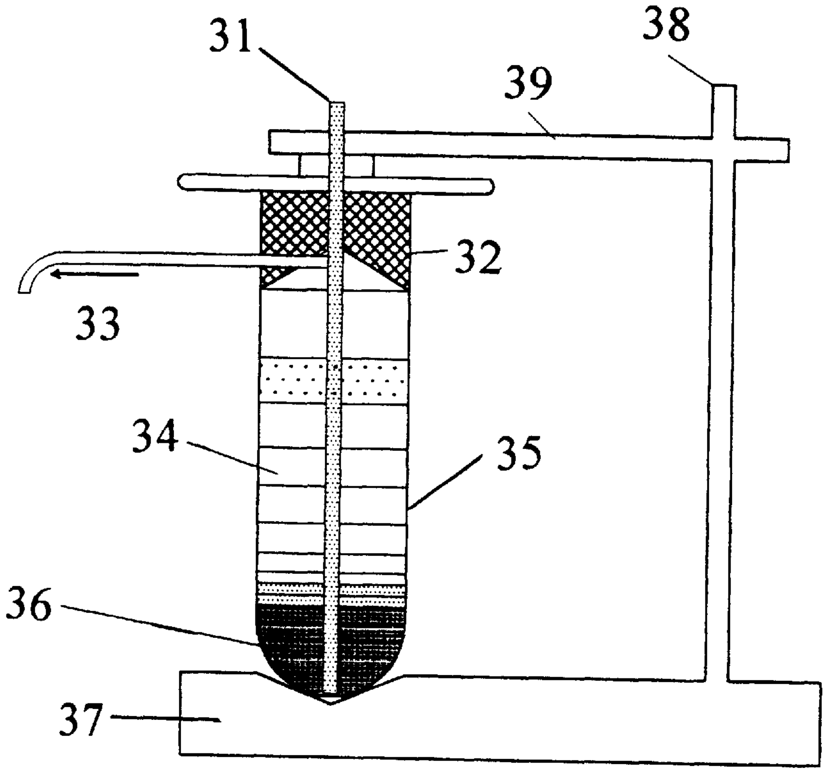
*FIG. 2* C
PRIOR ART

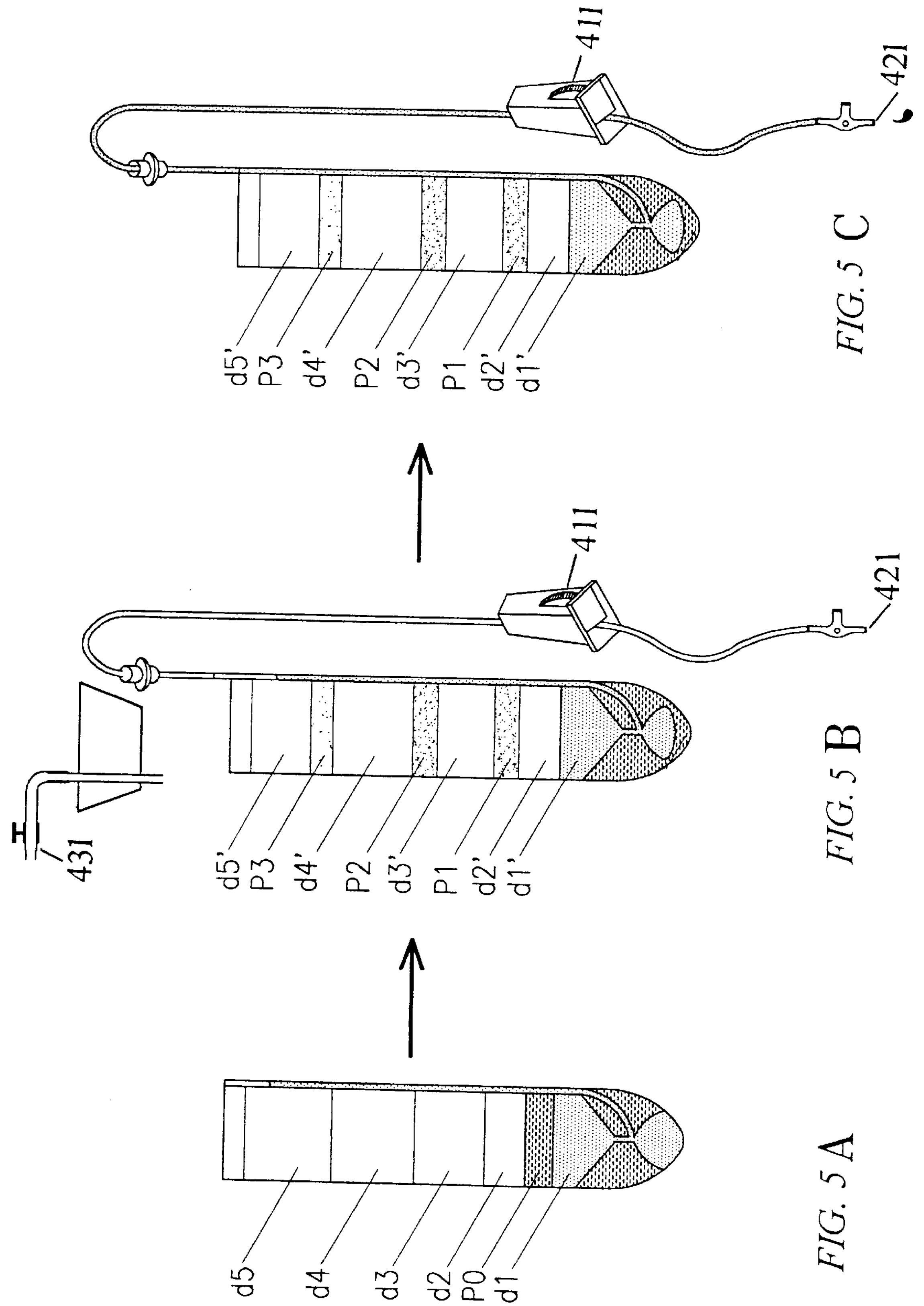
*FIG. 5* C
*FIG. 5* B
*FIG. 5* A

CENTRIFUGE TUBE WITH A BUILT-IN SMALL TUBING FOR SEPARATION FOLLOWING DENSITY GRADIENTS CENTRIFUGATION

FIELD OF THE INVENTION

This invention relates to a centrifuge tube or a separation device and, in particular, to the use of density gradients centrifugation for separation of biological materials and cells.

DESCRIPTION OF THE PRIOR ART

Density gradients centrifugation is particularly useful in studies of cell biology, bacteriology, virology, and biochemistry. To employ this technique, several media with gradients of different densities are added to sample solutions prior to centrifugation. After centrifuge, the medium with a greatest density will stay at the bottom , and the medium with a smallest density will stay at the top. In the mean time, cells or materials with different densities will be also separated into different gradient layers. The typical procedure for density gradients centrifugation is described in FIG. 1.

To harvest desirable portions of cells or materials, each layer has to be collected separately. Three common methods for collecting solution layers are described respectively in FIG. 2: (1) by means of pipettes, solution layers are drawn one by one starting from the top; (2) the collection is done by the penetration of a needle through the wall of a centrifuge tube; and (3) by use of a gradient collector, different layers of solutions are collected by injecting a flotation medium to a centrifuge tube. Since the flotation medium has a higher density, it stays at the bottom. After adjusting of the volume of flotation medium, each layer of solution is then eluted one by one. A typical gradient collector is described at the bottom of FIG. 2, which consists of a plastic tube 31, a cap 32, an elution tube 33, gradients 34, a centrifuge tube 35, a flotation medium 36, a base 37, a support column 38 and a retaining arm 39.

Pipetting is time consuming and low in efficiency, particularly when a target layer has a large surface area, or the solution layer is not deep enough, which often causes undesirable disturbing of adjacent layers. As to the penetration of a needle through the wall of the centrifuge tube, it is less safe and not easy to control. Vibration frequently occurs during penetration, which may reduce the efficiency of separation. Besides, the centrifuge tube must be discarded after penetration.

Although the use of a gradient collector is more efficiency in time consumption and accuracy of separation, it is disadvantaged by the need of a large amount of flotation medium. Since the high priced sterilized flotation medium is often required in biological study, it is not economic to use the gradient collector for routine work.

It is an object of the present invention to provide a centrifuge tube that combines functions of a separation funnel and a centrifuge tube simultaneously which significantly improves the efficiency of separation and collection of desirable cellular materials in density gradients centrifugation.

It is another object of the present invention to provide a reusable centrifuge tube utilizing atmospheric pressure and gravity to complete desirable separation in an economic and routine manner.

SUMMARY OF THE INVENTION

This invention relates to a centrifuge tube used in density gradients centrifugation and subsequent gradient collection.

One aspect of the invention is to provide for a centrifuge tube whose inner bottom looks like a funnel, in addition, a small tubing is built inside one wall of the centrifuge tube, and the bottom end of the small tubing is connected to the funnel-like inner bottom of the centrifuge tube. The centrifuge tube possesses a combining function conventionally performing by a separation funnel and a centrifuge tube and, therefore, can be used to replace the separation funnel and centrifuge tube in density gradient centrifugation.

Another aspect of the present invention is to provide for a centrifuge tube having an air valve or a clamp and by adjusting which, one can utilize the atmospheric pressure to separate each gradient layers due to siphonic effect.

One more aspect of the invention is to provided for a centrifuge tube whose bottom space may be in a variety of shapes and sizes such as in a conical, or a funnel, or a round shape to increase the height of gradients, and therefore make the separation and collection much more convenient.

Since the centrifuge tube in accordance with the present invention can perform the functions of separation and collection without the need of needle penetration, the centrifuge tube is reusable and can be used under regular and ultra centrifugation. In addition, the centrifuge tube provided by the present invention does not require injection of a floatation medium and is more efficient than the use of a gradient collector which requires a more complex apparatus.

BRIEF DESCRIPTION OF FIGURES

FIG. 2A–C illustrate prior art methods available today for separation of pancreatic cells after density gradients centrifugation; method A—use of pipettes to withdraw each layer respectively from the top to the bottom; method B—use of needles to penetrate the wall of centrifuge tube to reach the desired layer and collect the fluid drop by drop; and method C—use of gradient collector by injection of flotation medium to the bottom of centrifuge tube followed by collecting the desired layer through adjustment of the height of flotation medium.

FIG. 4B refers to the situation after centrifuge; and FIG. 4C refers to the situation during collection.

FIG. 5A–C show solution layers in a centrifuge tube having a chamber located at the bottom of the tube for collection of pellet before centrifuge and post centrifugation separation and collection.

DETAILED DESCRIPTION OF THE INVENTION

Figure 1:
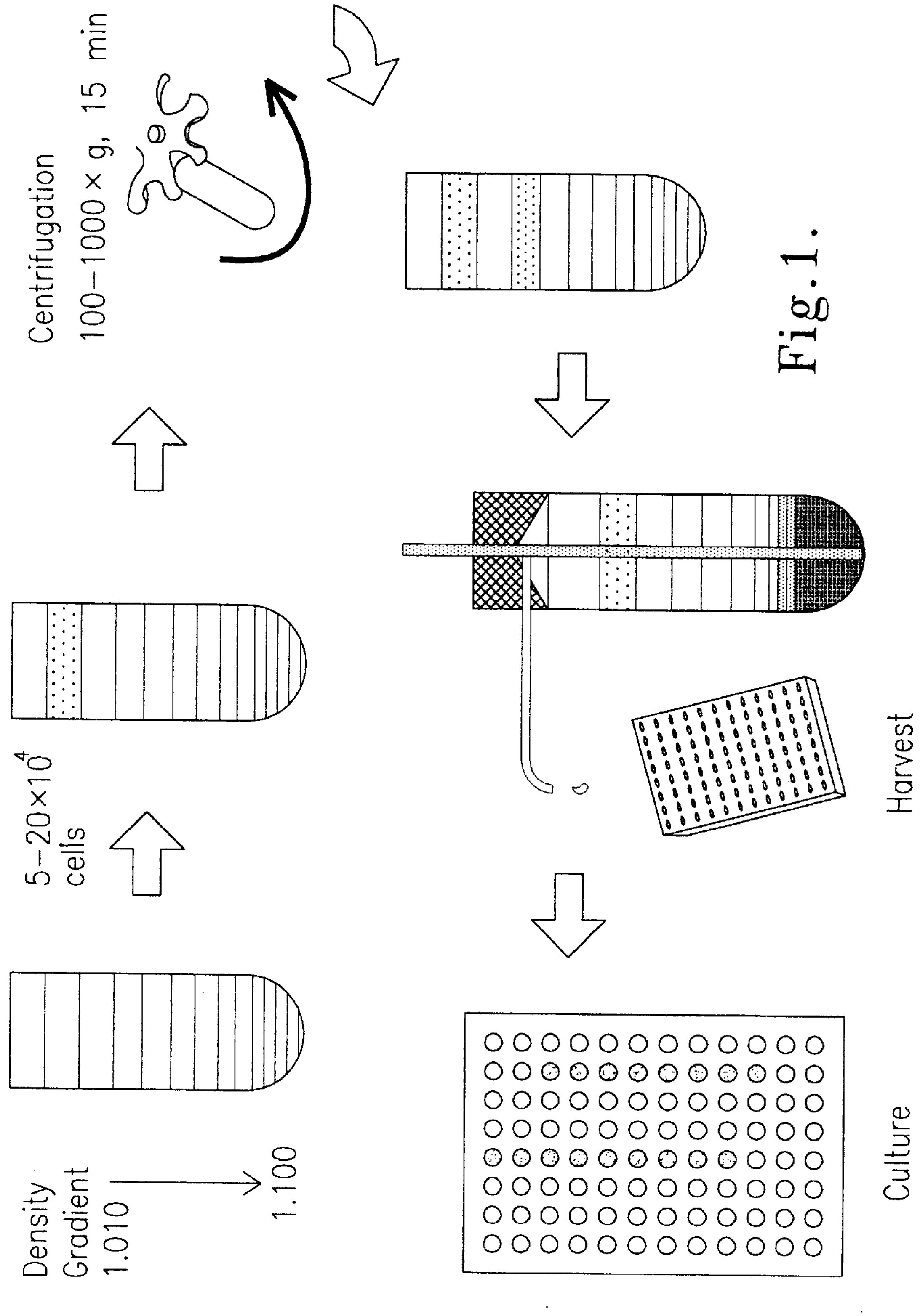
FIG. 1 shows the general principle of centrifugal separation in which the centrifugal force produced by 100 to 1,000 g for 15 minutes can separate cells or macro molecules into each layer. After centrifuge, each layer is collected separately wherein the numeral 1 illustrates collected materials and numeral 2 is media.
Figure 2A:
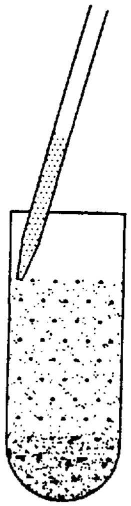
FIG. 2A PRIOR ART
Figure 3A:
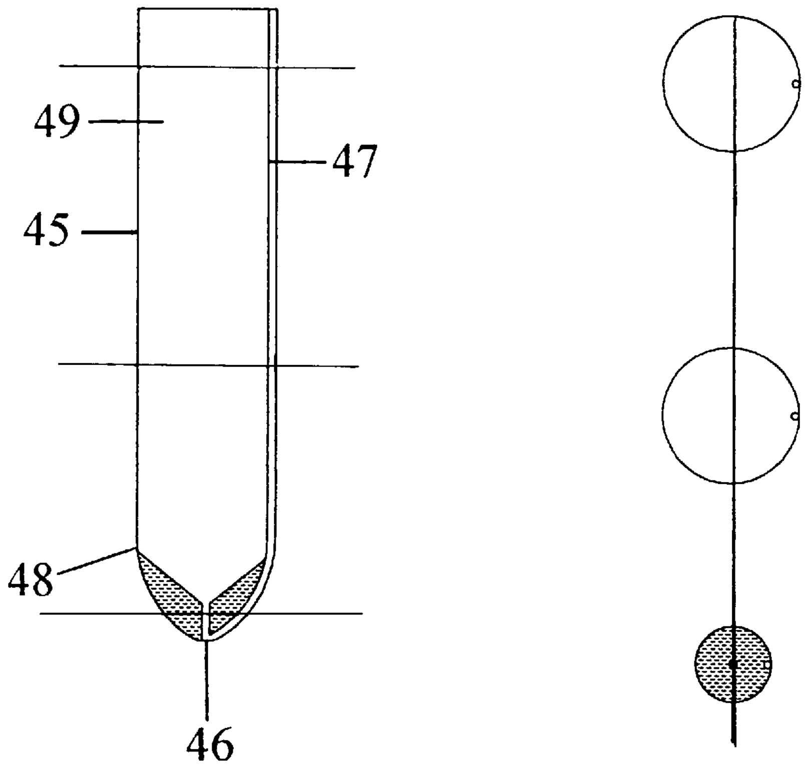
FIG. 3A–C show a cross section of a centrifuge tube according to the invention, and its operational procedure.
Figure 3B:
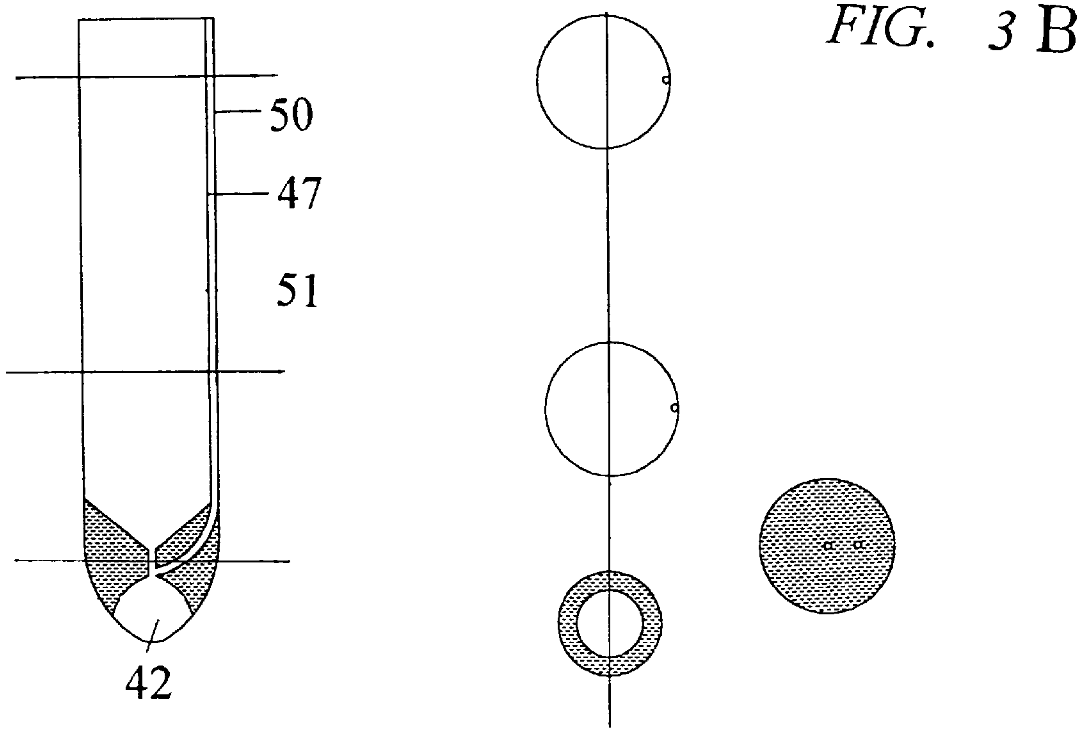
Figure 3C:
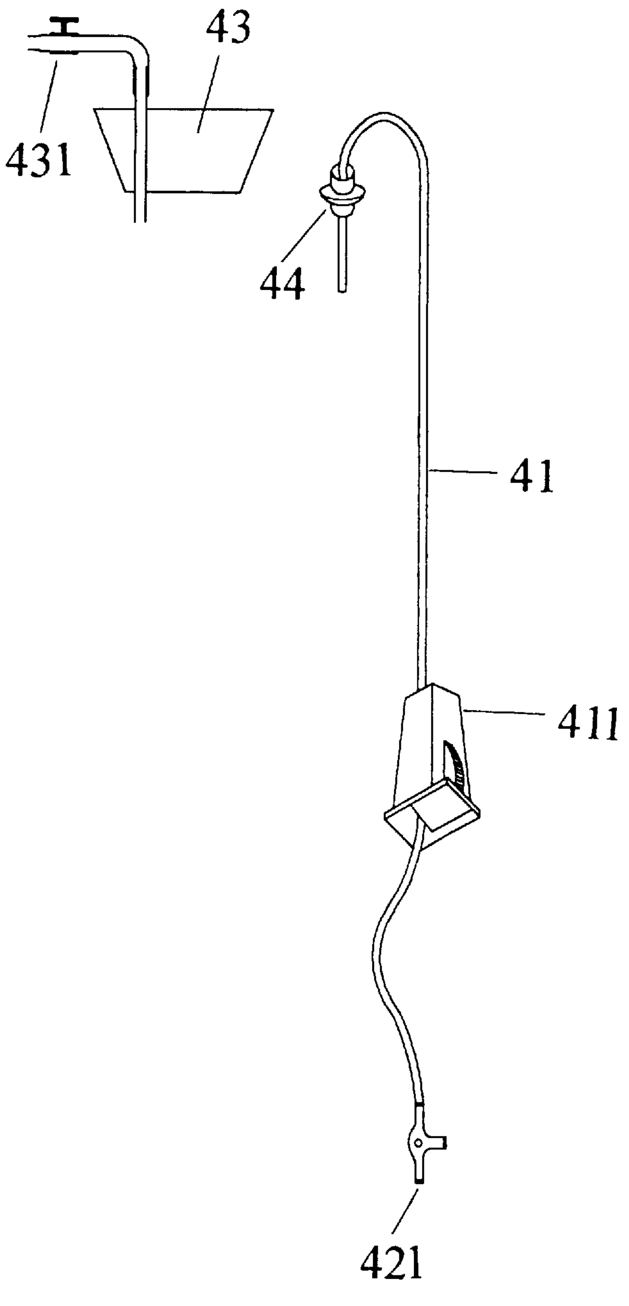

This invention provides an apparatus having functions of a separation funnel and a centrifuge tube, with a built-in small tubing inside an inner wall of a centrifuge tube for the preparation and separation of biological and cellular materials in density gradient centrifugation. As shown in FIG. 3, the apparatus of the present invention comprises mainly a centrifuge tube 45, a small built-in tubing 47, a cap 43, a fluent connector 44, a connecting tubing 41 and adjusting valves 411, 431.

The centrifuge tube 45 may be a round tube having an open end at its top and a closed end at its bottom and the distance between these two ends defines a hollow chamber 49 spanning substantially the entire length of the centrifuge tube 45 for accommodation of intended materials and medium. The hollow chamber 49 has a tunnel shape bottom 48 which has a small tubular orifice 46 at its narrowest site. The small tubular orifice 46 connects directly to the small built-in tubing 47 built inside the centrifuge tube 45 at a location between the hollow chamber 49 and an outside wall of the centrifuge tube 45. The small built-in tubing 47 spans along the entire length of the centrifuge tube 45 and is formed and enclosed between an outside surface 50 of the outside wall of the centrifuge tube and an inner surface 51 of the hollow chamber 49 and becomes an integral part of the centrifuge tube 45. The small built-in tubing 47 has one end connected to the small tubular orifice 46 and the other end connected to the fluent connector 44 on which the connecting tube 41 is mounted such that the intended materials and medium can be easily withdrew from the centrifuge tube 45 by the fluent connector 44 due to the connection of the small tubular orifice 46 to the connecting tube 41 through the small built-in tubing 47.

The bottom of the centrifuge tube 45 may be in a variety of shapes such as in a conical, arcial, flat, or bottle shape, or in a reverse conical shape. The bottom of the hollow chamber 49 may be in a funnel-like shape or a conical shape. However, the funnel shape is preferred because it increases the height of media used in the centrifuge tube 45 and therefore facilitates the separation.

Before centrifugation, medium having highest density is injected first. The amount of the medium must be sufficient to go over the height of the funnel shape bottom 48 and to fill the small built-in tubing 47. Other media are then introduced into the centrifuge tube 45 slowly against the wall. Materials intended for separation are added to the middle or top of the gradients. During centrifugation, cells or macro molecules are spinned and distributed into different media according to their densities. After centrifugation the centrifuge tube 45 is removed and held by a test tube clamp (not shown in FIG. 3). In order to collect each layer separately, the top opening of the centrifuge tube 45 is insertably covered by a cap 43, followed by connecting the small built-in tubing 47 with the fluent connector 44 which is mounted with the connecting tube 41. The cap 43 is further equipped with the adjusting valve 431 having one end penetrating through and projecting above the cap 43 and the other end suspending inside the centrifuge tube 45 when the cap 43 is mounted on the top opening end of the tube 45. The valve 431 allows one to adjust the exerting air pressure normally produced by the atmospheric pressure through the control of valve opening to produce siphonic effects. As an alternative, separation can also be done by performing a suction through the distal adjusting valve 411 by means of siphon or by the aid of a peristalsis pump 421. The distal adjusting valve 411 may be a commercially available three way valve. Thus, each layer of medium is collected slowly by flowing through the small tubular orifice 46 at the bottom of the centrifuge tube 45 to the outside connecting tube 41.

The centrifuge tube 45 could be made in a variety of sizes to fit for any or particular purposes. It can be made of various plastic materials, such as polycarbonates, polypropylene, polystyrene, polyoxvmethylene, polyallomer, glass, or metals. Transparency of the tube wall gives better efficiency because it allows quick and clear observation during the separation process. The cap 43 can be made of any kind of elastic rubber or silastic materials, as long as it can fit into and tightly close the top opening of the centrifuge tube 45. It does not require specific materials to make the adjusting valves 431, 411, the connecting tube 41 as long as they allow good control of air and siphonic effect.

Formation of a pellet upon centrifuge sometimes clogs the funnel type bottom. To avoid clogging, a fixed angle rotor may be employed so that the pellet will be formed at one side of the bottom. Alternatively, this potential problem can be eliminated by incorporation of a small chamber beneath the funnel shape bottom 48 as both illustrated in FIG. 3B and FIG. 5. A conical chamber 42 is built immediately underneath the small tubular orifice 46 which allows sedimentation of pellets to the bottom of the conical chamber 42 during the centrifugation to facilitate subsequent collection of pellets without clogging the funnel shape bottom 48. This design also allows the use of swinging rotors without clogging. The conical chamber 42 may be in a variety of different shapes other than a conical.

It is a good practice to fill first medium into the small built-in tubing 47 in full prior to centrifugation, otherwise some unexpected layers of media may present in the small built-in tubing 47 after centrifugation. If this occurs due to above stated reason, it can be overcome by performing a second centrifugation because the centrifugal force will exert pressure to media in the small built-in tubing 47 to push media back to the hollow chamber 49 of the centrifuge tube 45.

This invention can be further explained by the following example:

EXAMPLE I

Isolation and Separation of Pancreatic Cells

Figures 4A, 4B, 4C:
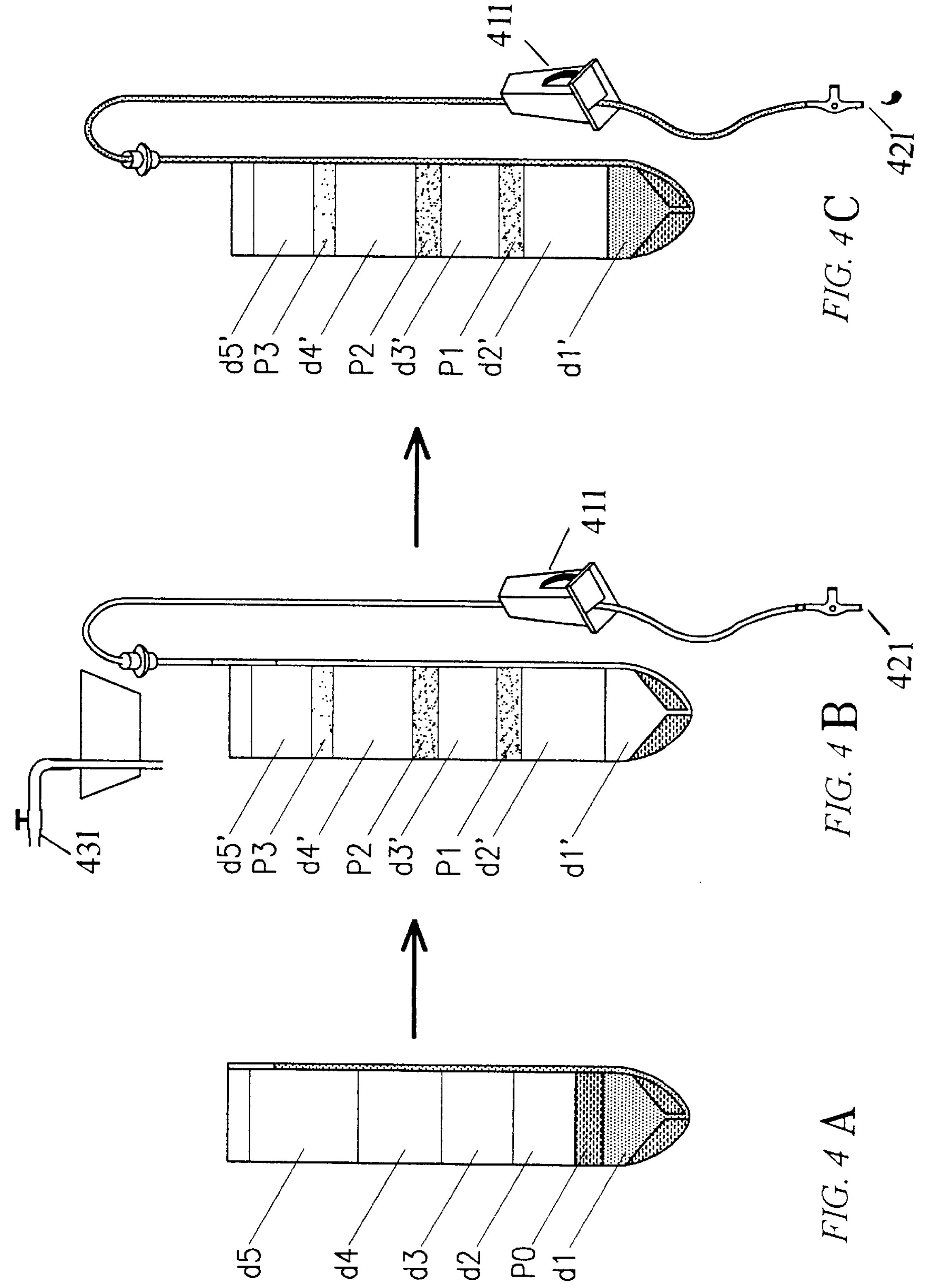
FIG. 4A–C illustrate the use of a centrifuge tube according to the invention for separation and collection of each layer before and after centrifuge wherein FIG. 4A refers to the situation before centrifuge.

To purify pancreatic cells after digestion by collagenase, 8 ml of 20% dextran, 6 ml of 16% dextran, 1 ml of digested fluid, 6 ml of 14% dextran, 6 ml of 9% dextran, 6 ml of Hank's solution are injected in sequential orders into a 50 ml size traditional centrifuge tube and a centrifuge tube in accordance with the invention. As depicted in FIG. 4A and FIG. 5A, PO represents 1 ml digested pancreatic fragments, d1 represents 8 ml of 20% dextran, d2 represents 6 ml of 16% dextran, d3 represents 6 ml of 14% dextran, d4 represents 6 ml of 9% dextran, d5 represents 6 ml of 9% dextran, d5 represents 6 ml of Hank's solution. After centrifuge, pancreatic islets and cells are separated due to their differences in specific gravity (FIG. 4B, FIG. 5B). The symbols P1, P2, and P3 represent concentrated pancreatic islets after centrifuge. The symbols d1', d2', d3', d4', d5' in FIG. 4B and 5B represent each layer after centrifugation which is subsequently collected from the centrifuge tube in accordance with the procedures described above.

Although the preferred embodiments of the invention have been disclosed for illustrative purposes, those skilled in the art will appreciate that various modifications, additions and substitutions are possible, without departing from the scope and spirit of the invention, as disclosed in the accompanying claims.

What we claim is:

1. An apparatus having a combining function of a separation funnel and a centrifuge tube useful in density gradient centrifugation and separation of biological materials in media, comprises:

a centrifuge tube having a top open end and a bottom closed end and a distance thereof defining a hollow chamber disposed internally and spanning the entire length of said centrifuge tube for accommodation of the biological materials; said hollow chamber has a conical end with a small tubular orifice extended thereof to form a funnel-shape bottom located correspondently to the closed end of said centrifuge tube for passage of the media;

a small built-in conduit built inside said centrifuge tube at a location between the hollow chamber and a side wall of the centrifuge tube wherein said small built-in conduit spans the entire length of the centrifuge tube and is formed and enclosed between an inner surface of the side wall of said centrifuge tube and an outside surface of the hollow chamber to become an integral part of the centrifuge tube and is connected directly through a bottom end of said small built-in conduit to the small tubular orifice;

a fluent connector insertably connecting to a top end of the small built-in conduit and is further connected with a connecting tube outside the centrifuge tube to provide a passageway for the media from the hollow chamber to the outside of the centrifuge tube;

A adjusting valve connected to the connecting tube to adjust flow speeds of the media produced by a suction means; and A means for separating the biological materials from the centrifuge tube including connecting the small built-in conduit with the connecting tube through the fluent connector, activating the suction means to generate a siphonic effect to withdraw media and adjusting the adjusting vale to collect the biological materials pertaining to their media densities.

2. The apparatus according to claim 1 further comprises a cap insertably mounted on the top opening end of the centrifuge tube wherein said cap is further equipped with a adjustable valve for control of the exerting air pressure produced by the atmospheric pressure.

3. The apparatus according to claim 1 wherein said centrifuge tube may have a bottom in a variety of shapes such as in a conical, arcial, round, flat, bottle, or a reverse conical shapes.

4. The apparatus according to claim 1 wherein said centrifuge tube further comprises a small chamber built immediately underneath the small tubular orifice which allows sedimentation of pellets to the bottom of the chamber during the centrifugation.

5. The apparatus according to claim 1 wherein the bottom of said hollow chamber may be in a variety of shapes other than in the funnel-shaped.

6. The apparatus according to claim 1 wherein said centrifuge tube may be made from various materials consisting of polycarbonates, polypropylene, polystyrene, polyoxvmethylene, polyallomer, glass, or metals.

7. The apparatus according to claim 1 wherein the suction means may be a peristalsis pump.

* * * * *